April 21, 1964 H. KOSOFF 3,129,878
MECHANICAL APPARATUS
Filed Jan. 29, 1962 3 Sheets-Sheet 2

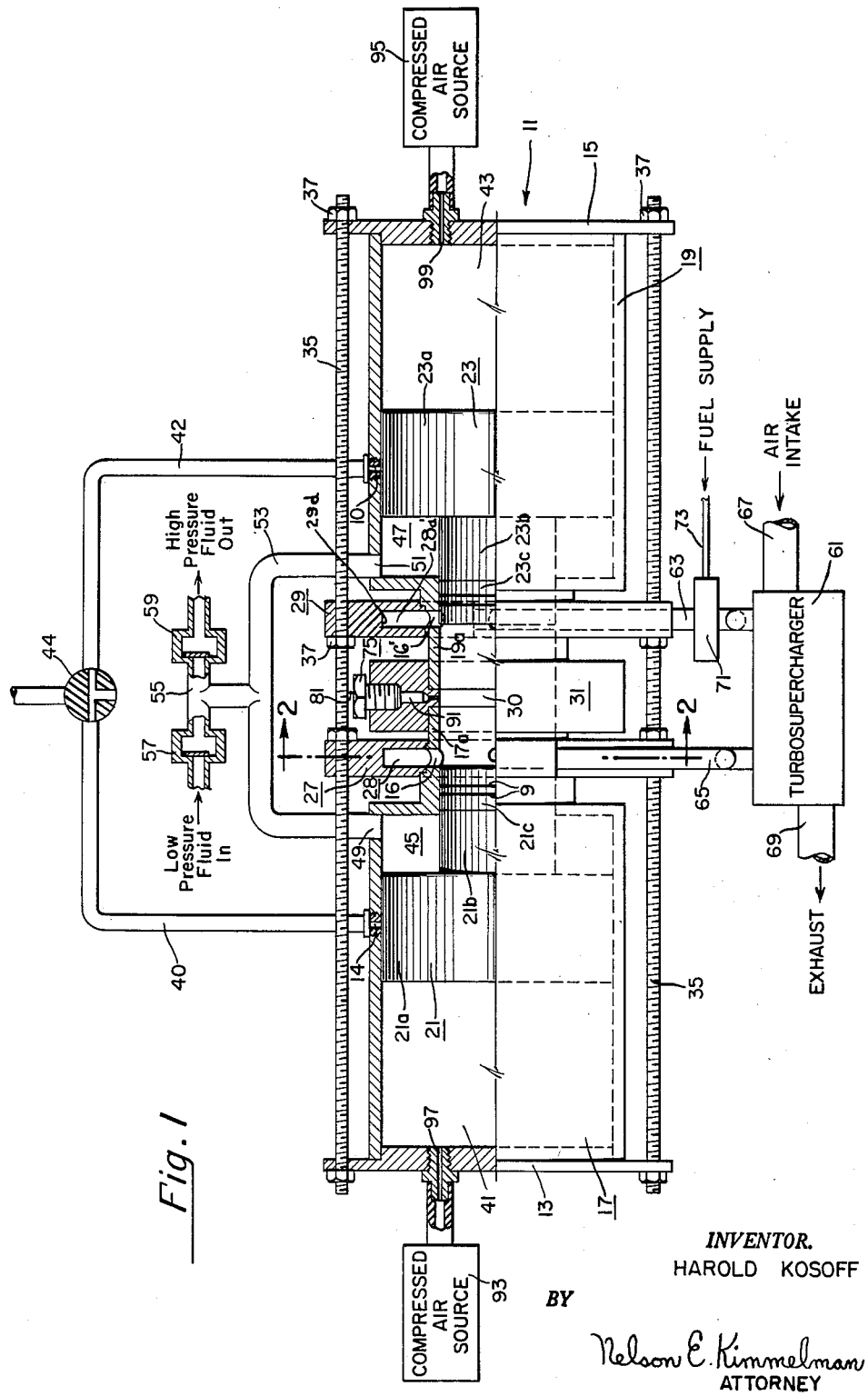

INVENTOR.
HAROLD KOSOFF
BY
Nelson E. Kimmelman
ATTORNEY

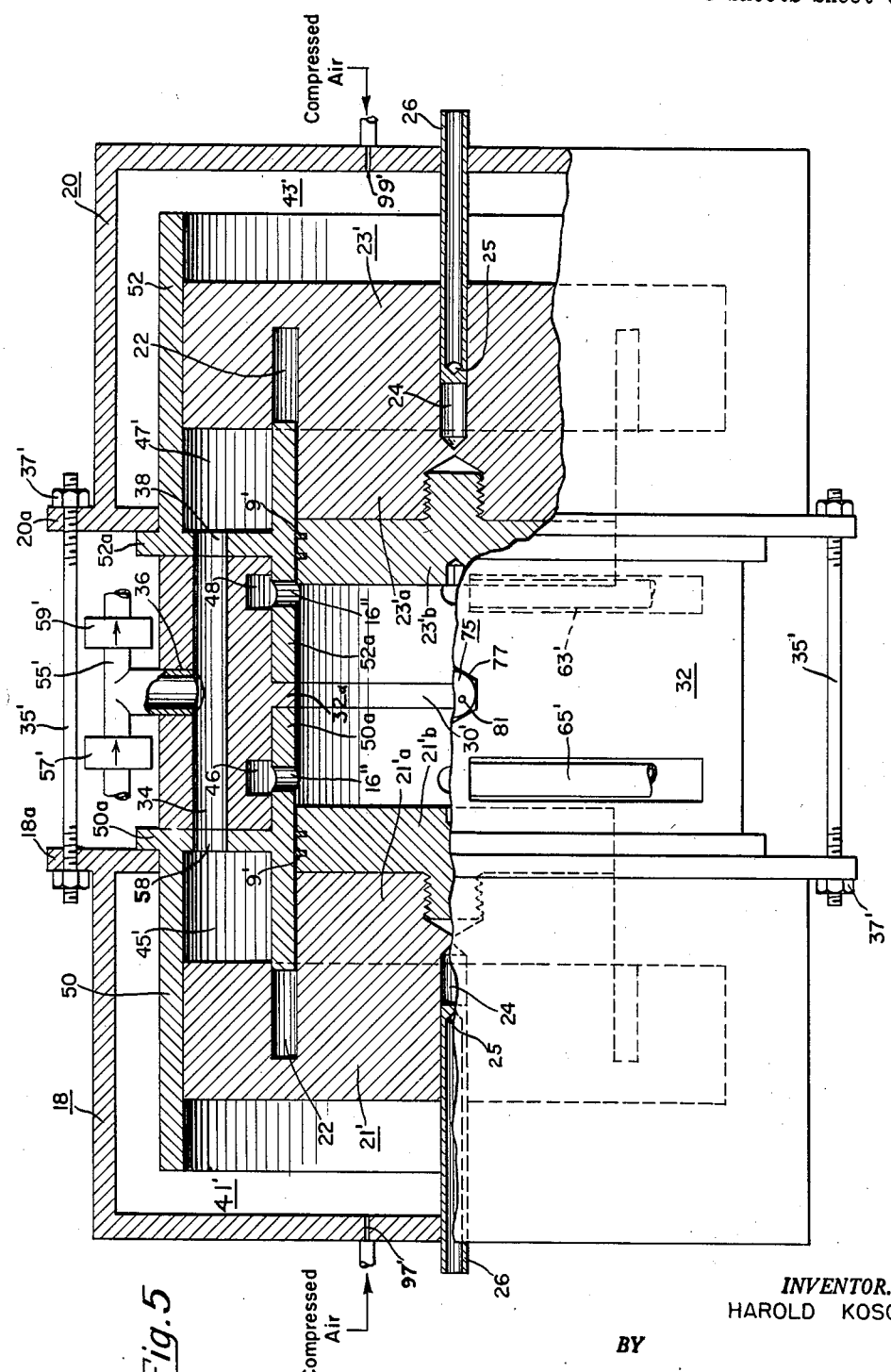

United States Patent Office 3,129,878
Patented Apr. 21, 1964

3,129,878
MECHANICAL APPARATUS
Harold Kosoff, 1203 Hale St., Philadelphia 11, Pa.
Filed Jan. 29, 1962, Ser. No. 169,311
25 Claims. (Cl. 230—56)

This invention relates to a free-piston engine and in particular to a free-piston engine composed of relatively few parts which may be manufactured at very low cost.

In the prior art there have been free-piston engines having one-piece combustion cylinders with rebounce-pump cylinders affixed thereto at each end. This required seals at the junctions of the combustion cylinder and the rebounce-pump cylinders. In addition with such a construction it was necessary to have extremely precise alignment as the pistons reciprocated within the different cylinders.

Also, in prior art free-piston engine structures, there was a manifold structure which generally surrounded the combustion cylinder and necessarily was large and voluminous since it usually enclosed the mechanical synchronizing linkage between the two pistons.

The manifold structure which brought in air and exhausted gaseous combustion products from the combustion chamber in prior art free-piston engines customarily had an essentially circular inner channel for the introduction of air and gases. A circular inner shape is a relatively inefficient geometry for an input channel or an output channel.

Prior art free-piston engines, being constructed of a number of joined-together cylinders and chambers, necessarily required a relatively large number of devices (and operations) for fastening the various parts of the engine together at their junctions. This made for more expensive production of such engines and prolonged the time required for repair and maintenance of them.

It therefore is an object of the invention to provide a free-piston engine of simplified and inexpensive construction.

Another aim of the invention is to provide a simple free-piston engine having relatively few parts.

Still another object of the invention is to provide a free-piston engine having fewer problems of aligning the various component chambers with one another.

Another object of the invention is to provide a free-piston engine which is constructed to permit non-mechanical piston movement synchronization.

Yet another object of the invention is to provide a free-piston engine of smaller size than comparable prior art free-piston apparatus.

Still another object of the invention is to provide a novel free-piston engine having a smaller manifold structure which is constructed to facilitates a better mixture of the fuel and air within the combustion chamber.

Another object of the invention is to provide a free-piston engine having spirial intake and output manifold channels for more efficient fuel introduction and exhaust operation.

Another object of the invention is to provide a free-piston engine having fewer seals than formely were required.

Another object of the invention is to provide a novel free-piston engine which is held together by fewer fastening devices than those known in the prior art.

Still another object of the invention is to provide a simple free-piston engine composed of interfittings parts for ease of production and maintenance.

Other objects of the invention will occur to those skilled in the art from a perusal of the specification, claims and drawings herein in which:

FIG. 1 is a side-elevation view partially in section, of one form of my novel free-piston engine.

FIG. 5 is a side elevation view, partly sectional, of another embodiment of my invention.

Figure 3:
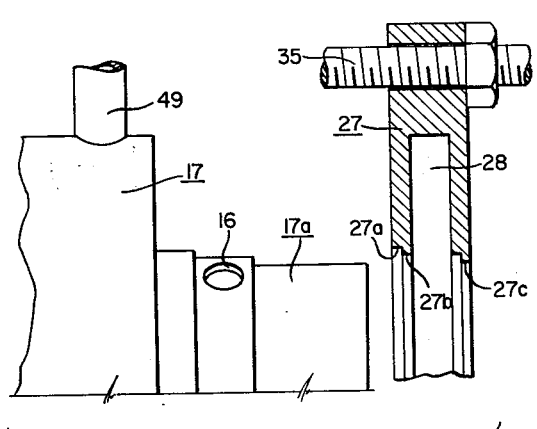
FIG. 3 is a sectional side elevation view of the exhaust manifold, in part, taken in the direction of the arrows associated with the section line 3—3 in FIG. 2 and a side elevation of the interfitting end of the left cylinder.

Referring to FIG. 1 there is shown a free-piston engine indicated generally at the numeral 11 which consists of two end caps 13 and 15 fitted in the outer ends respectively of the cylinder members 17 and 19. Within the two cylinders 17 and 19 are the respective pistons 21 and 23 having respective larger diameter cylindrical sections 21a and 23a and concentric smaller diameter sections 21b and 23b. The pistons 21 and 23 are constructed and arranged to have opposite axial movements toward and away from one another on the compression and expansion strokes.

The cylinders 17 and 19 have respective narrower end portions 17a and 19a which pass through cylindrical exhaust and intake manifolds indicated generally at the numerals 27 and 29. The edges of the portions 17a and 19a fit into coaxial apertures 31b and 31c within a combus-block 31 (see FIG. 4). The component parts of the entire engine are held in compression by a set of say, four longitudinal bolts 35 which pass through unthreaded apertures in the manifolds 27 and 29 and through unthreaded apertures in the end caps 13 and 15. The bolts 35 are secured tightly to the engine by fastening devices such as the nuts 37 shown.

It will be noticed that the manifold cylinders 27 and 29 are pressed against the cylinders 17 and 19 by the nuts fastened to the bolts 35 near the manifold cylinders; otherwise the manifolds could move toward one another.

It may thus be seen that the engine 11 is easily assembled for all that is required is to insert pistons 21 and 23 into their respective cylinders, pass the end portions 17a and 19a through the manifolds 27 and 29 and into the apertures 31b, 31c in the combustion block 31, insert the end caps 13 and 15 into the cylinders 17 and 19, pass the bolts 35 through the apertures in the manifolds and in the end caps and secure them tightly by nuts 37. Of course gasket material may be used at desired junction points.

There are formed within the engine 11 two rebounce chambers 41 and 43, two pump chambers 45 and 47, and a combustion chamber 30 in the block 31 defined by the enclosed space between the faces of the pistons 21 and 23. In my co-pending application Serial No. 76,933, filed on December 19, 1960, I have described a new type of free-piston engine in which synchronization of the pistons' movement does not require mechanical linkage between the pistons. The basic principle of the type of synchronization mentioned in that application is as follows: the displacement of the center of mass of the pistons should be maintained near the engine center. By providing vents (14 and 10) within the rebounce chambers the piston which uncovers more of the vent on its inward stroke thereby reduces the pressure more in the rebounce chamber associated with that piston. This reduction in pressure at the back of the piston tends to increase relatively the pressure exerted on its front side which thereby tends to correct for its earlier excessive inward movement. A small flow of high pressure gas enters the rebounce chambers via small orifices 97 and 99 to replace gas escaping through the vents 10 and 14.

In order for this synchronization to be maintained at an optimum there should be one intake and one exhaust valve associated with the interconnections between the pump chambers otherwise imperfect valve action will give rise to large unbalanced forces on the pistons. Since there are two pump chambers 45 and 47 a common conduit system and valves may be used.

There are two ports 49 and 51 which communicate via the conduit 53. The conduit 53 is connected to a conduit section 55 to which is connected an intake check valve 57. Valve 57 permits low pressure fluid (pneumatic or hydraulic as desired) to enter the pump chambers 45 and 47 when the pistons 21 and 23 are moving away from one another. An exhaust check valve 59 is provided by which the high pressure fluid in the pump chambers 45 and 47 may be evacuated.

A turbosupercharger 61 may also be attached to the input and exhaust manifolds 29 and 27 respectively by conduits 63 and 65. The turbosupercharger 61 has an intake line 67 which is to be connected to the ambient atmosphere. When the piston 23 moves away from the combustion chamber and uncovers the ports 16' formed in the portion 19a of cylinder 19, a mixture of compressed air and fuel enters the combustion chamber 30 via the manifold 29. There is also exhaust line 69 which takes away the combustion products from the combustion chamber when the piston 21 uncovers the ports in the portion 17a of the cylinder 17. The gases expelled by means of the exhaust conduit 65 drive a turbine (not shown) in a section of the turbosupercharger 61 which is isolated from the intake section. The shaft (not shown) about which the turbine revolves is coupled to a compressor shaft within the input section. The compressor supplies compressed air to the input manifold 29 to scavenge the combustion chamber of the gaseous combustion products. In line 63 is inserted a fuel metering device 71 such as a simple needle valve used in carburetors which is connected to a fuel supply (not shown) by a conduit 73. Preferably, the exhaust ports 16 in the portion 17a are situated more to the center than are the ports 16' of the portion 19a.

Figure 2:
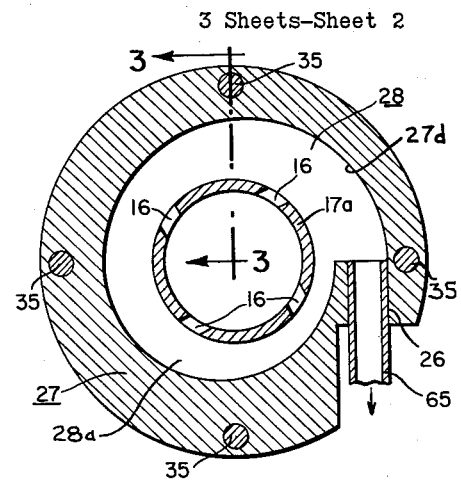
FIG. 2 is a sectional view taken in the direction of the arrows associated with the section line 2—2 in FIG. 1.

Referring now more particularly to FIGS. 2 and 3, details of the inner construction of the portions 17a and 19a and their interfitting relation to the respective manifolds 27 and 29 will be explained in connection with the manifold 27 only, as manifold 29 is substantially identical thereto. The portion 17a (as does its counterpart 19a) has three cylindrical sections of decreasing diameter as its right edge is approached. There are three correspondingly sized bores 27a, 27b and 27c which mate with the similar surfaces of portion 17a when it is inserted fully into the manifold 27. The latter also has an internal hollowed-out portion 28 bounded by an inner wall 27d which is substantially spiral. The exhaust conduit 65 is fitted within an aperture 26 as shown.

When the portion 17a is inserted into the manifold 27 and the outward movement of the piston 21 uncovers the ports 16 these ports permit the gaseous combustion products within the combustion chamber 30 to pass through the ports 16 into the space 28a (which is located between wall 27d and the outer surface of portion 17a) and out of the manifold 27 via the conduit 65.

As stated above, the intake manifold 29 is identical to manifold 27 and the portion 19a interfits with manifold 29 in the same manner. When the piston 23 moves outward and uncovers the slanted ports 16' in the portion 19a, the charge of compressed air and fuel from the fuel metering device 71 is fed into the combustion chamber 30 from the conduit 63. If the wall section 29d (FIG. 1) of manifold 29 (which corresponds to wall 27d of manifold 27) were circular instead of being spiral, the cross-section of the space 28a' presented to the gaseous mixture supplied from conduit 63 would be constant. As the mixture flowed through the ports 16 in to chamber 30, the reduced quantity of gas circulating in space 28a' would undergo a reduction of its pressure. This pressure difference would give rise to turbulence and loss of energy in the combustion chamber 30 where the gases passing through the several ports 16 meet, and also at the junction of conduit 63 and the space 28a' where the input flow and the remainder of the circulating gas mixture meet.

The spiral peripheral wall 29d and the outer surface of portion 19a produce a progressively smaller cross-section so that the pressure is maintained substantially constant. Thus, turbulence is minimized with the result that the necessary pressure differential between the manifolds is lessened. Consequently, the power demanded of the turbosupercharger is also lessened.

*Starting Mechanism*

Figure 4:
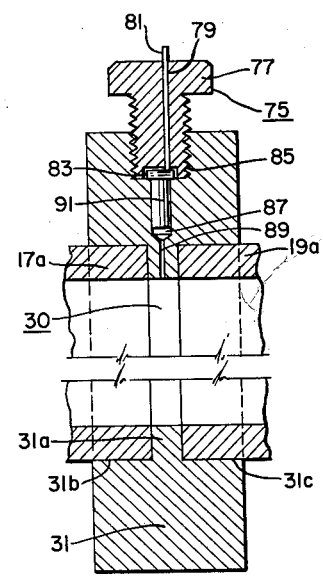
FIG. 4 is an enlarged sectional view of the details of the starting subassembly associated with the combustion chamber.
Figure 7:
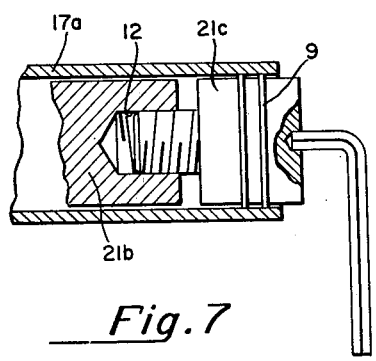
FIG. 7 shows a second step in the process of inserting the detachable piston head into the body of the piston.

Within the combustion block or cylinder 31 there is located a starting subassembly indicated generally by the numeral 75 in FIG. 4. It consists of a bolt 77 which has an off-axial aperture 79 drilled therein in which a rigid metallic pin 81 is disposed for axial movement therein. The bolt 77 also has a circular recess 83 at its lower end as shown. The bolt is screwed into a threaded hole 85 in the block 31. Connecting with the hole 85 is a concentric hole 87 which is connected at its lower end with another, smaller diameter aperture 89 that communicates with the combustion chamber 30.

To start the engine 11 a powder charge such as a small calibre rim-fired bullet 91 whose head has been removed and the exposed end is sealed with a combustible evaporizable substance such as "Sterno" is inserted with its back end upward in the hole 87. The bolt 77 is then screwed tightly into the aperture 85. The pistons 21 and 23 are moved as closely as possible toward one another by the application of compressed air (or equivalent) into the rebounce chambers 41 and 43 from sources 93 and 95 (which may be a common source) via the small orifices 97 and 99 in fittings such as are shown screwed into the end caps 13 and 15. When the pistons are moved to their respective innermost positions it will be seen that the vents 14 and 10 will be uncovered. To prevent the compressed air in the rebounce chambers from escaping through these vents, conduits 40 and 42 are provided connected to fittings in the vents 14 and 10. The conduits 40 and 42 connect to a valve 44 which may be of the manual type. During starting, the valve 44 is closed so no compressed air escapes.

After the pistons have been moved together and the pressure in the rebounce chamber reaches a proper value the pin 81 is given a sharp knock and the force is transmitted to the rim of the cartridge causing it to explode and the high pressure gases force the pistons apart. The valve 44 is then opened to permit the synchronizing action of vents 14 and 10 to be operative. Once the engine has been started and the valve 44 is opened, a small amount of compressed air from sources 93 and 95 continues to flow into the rebounce chambers to maintain a desired pressure therein.

FIGURE 5 shows another form of my invention. In this form, the individual manifold cylinders and the combustion block are replaced by a single combination-purpose block 32. Also, no separate end caps are required and the bolts which hold the components together are not required to be as long as in the previous embodiment.

This form of my invention consists of a combination block 32 which is cast or otherwise constructed to have an aperture 34 disposed parallel to the central axis thereof and another aperture 36 disposed at right angles thereto and being connected externally to intake check valve 57', output check valve 59' and the conduit 55' which may be identical to their unprimed counterparts in the apparatus shown in FIG. 1.

The aperture 34 is aligned with apertures 58 and 38 in the two members 50 and 52 which are pressed against the combination block 32 on each side thereof and which, with two pistons 21' and 23', form pump chambers 45' and 47' as shown.

The combination block 32 has two manifold sections 46 and 48 whose interior construction may be substantially identical to the space 28 shown in FIG. 2 except for the stepped portions 27a, 27b and 27c. There are ports 16" located in the portions 50a and 52a toward their adjacent edges in the block 32. The ports 16" in the member 50 are closer to the center of the engine than are the ports 16" in the member 52' to permit the exhaust action to commence before applying the input air-fuel charge to the combustion chamber via the intake conduit 63' and the manifold 48. As in the previous embodiment when the pistons 21' and 23' uncover the ports 16" during their outward strokes, gaseous combustion products leave the combustion chamber via the ports 16" and the manifold section 46 out to a turbosupercharger (not shown), for example. The input conduit 63' may also be coupled to a fuel source and source of compressed air such as a turbosupercharger (not shown) similar to the set-up of FIG. 1. Exhaust conduit 65' also leads to the turbosupercharger.

Alternatively, there could be a fuel-injector for applying fuel directly to the combustion chamber 30' if the fuel device 71 shown in FIG. 1 is not to be used. Simply as an illustrative arrangement, assuming no liquids were in the pump chamber 45' and 47', the output of the check valve 59' could be fed directly to the intake manifold 48 for scavenging the combustion chamber. By providing a spiral manifold structure 48 it is possible to maintain a high velocity of the air swirl past the injector so that there will be a thorough mixture of the fuel with it.

As in the combustion block 31 in the previous embodiment, the combination block 32 has two axial apertures. These apertures accommodate the portions 50a and 52a of the members 50 and 52 which are inserted therein until they are pressed tightly against the ridge 32a. Within the bore defined by the portions 50a and 52a are located the portions 21'a and 23'a of the pistons 21' and 23' and the portions 21'b and 23'b.

It will be noted that the pistons 21' and 23' in this embodiment have circular grooves 22 cut into their respective larger diameter sections. These grooves mate with the outwardly-extending walls of the portions 50a and 52a and are dimensioned and preferably sealed by conventional packing or O-rings so as to prevent leakage of fluid into them from the pump chambers 45' and 47' as well as to prevent the entry of gaseous discharges from the combustion chamber.

The pistons also have axial apertures 24 into which pipes 26 including vents 25 are fitted that extend through apertures in the end walls of the members 18 and 20 and are coupled to the ambient atmosphere. Pipes 26 and vents 25 in conjunction with small orifices 97' and 99' provide synchronization of the pistons similar to the action of the vents 14 and 10 and small orifices 97 and 99 in the embodiment of FIG. 1. As in FIG. 1 the pipes 26 can be connected by conduits to a common valve which communicates with the ambient atmosphere.

It is not essential that the pipes 26 be located on the axis of the pistons. As a matter of fact, the apertures 24 and the pipes 26 might better be located off-center so that the pistons cannot rotate about their respective axes. By preventing the pistons from rotating, the rings 9' will not have their respective joints (i.e., where they are split) aligned with any of the ports 16" so that they cannot get caught therein. If desired, the pipes 26 could have a cross-section other than circular, as for example, square, in which case the apertures would have similar cross-sections. Consequently, even if the latter apertures were on the axis of the pistons, the pistons would be prevented from rotating during operation of the engine.

The small orifices 97' and 99' in the end walls permit the entry of compressed air into the rebounce chambers for moving the pistons inward to their starting position and thereafter for maintaining a desired pressure within the rebounce chamber. This is similar to the action of small orifices 97 and 99 in the embodiment shown in FIG. 1.

Also, as in the previous embodiment a firing assembly 75 is provided having a bolt 77 with a pin 81, the location of the assembly 75 in the form shown being displaced about 90° from the former illustration but its location is not critical.

The members 18 and 20 are each integral and they are provided with flanges 18a and 20a which have a number of unthreaded apertures through which the assembly bolts 35' are passed and fastened under tension by the nuts 37'. The flanges 18a and 20a exert inward pressure against the flanged portions 50a and 52a thereby pressing the parts 50 and 52 against the combination block 32. There is no need for end caps in this embodiment as the members 18 and 20 have integral end constructions. They also have small orifices 97' and 99' into which conduits are fitted for coupling to sources (or a single source) of compressed air for forcing the pistons inward preparatory to starting the engine as in the previous form and also for maintaining the desired pressure in the rebounce chambers 41' and 43' during subsequent operation.

*Detachable Piston Heads*

Figure 6:
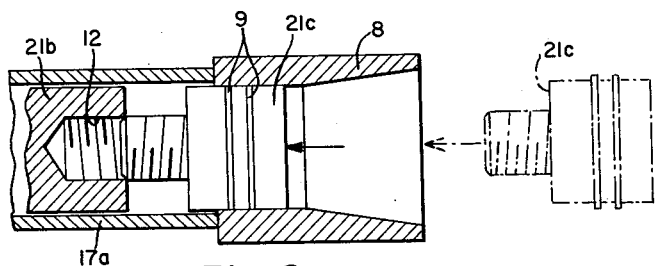
FIG. 6 is a side elevation view of apparatus showing one step in the process of mounting the demountable piston heads into the body of the piston.

By the very construction of my novel engine shown in FIGS. 1 and 5 it is apparent that the rings 9 on the pistons cannot be mounted according to conventional methods. If the pistons were of integral construction, the rings on the piston 21, for example, could not be fitted about the portion 21b by using a ring compressor since the portion 21b does not extend sufficiently past the right edge of portion 17a to enable it to be used. Consequently, some other method of providing rings had to be evolved. In accordance with another feature of my invention I provide that the pistons have demountable head portions to enable rings to be used with them. In FIG. 6 I show the first step of my novel process and structure for mounting the detachable piston head. The head section 21c of the piston 21, for example, has a number of rings 9 and also has a threaded plug portion to mate with the threaded aperture 12 within the section 21b. A ring compressor 8 is placed next to the bore of the section 17a. The uniform bore section of the compressor 8 is slightly smaller than the bore of section 17a. The detachable section 21c is introduced into the tapered bore end of the compressor 8, is pushed toward the left to cause the rings to be compressed and finally is pushed far enough left that its plug portion engages the aperture 12. The compressor 8 is then withdrawn and the section 21c is screwed tightly into portion 21b by means of an Allen wrench, for example, which engages a suitably shaped socket aperture in the end of piston head 21c. Other ways of screwing on the head or otherwise affixing it are, of course, possible.

While my invention has been described in terms of the two embodiments shown in FIGS. 1 and 5 it should be understood that it is well adapted for other forms of free-piston engines such as the one shown in my co-pending application Serial Number 109,039, entitled "Mechanical Apparatus," which was filed on May 10, 1961. In that application I describe an engine having piston heads in the combustion chamber which have larger diameters than the other parts of the pistons. The combustion and rebounce chambers are the same size whereas the pump chambers, which are situated at the respective ends of the rebounce chambers, are considerably smaller as it is desired to obtain high pressure in the hydraulic fluid disposed therein. Regardless of the structural differences between that engine and the ones disclosed herein, the features of the present invention can easily be adapted to it. The combustion and rebounce chambers could be formed by providing two cylindrical members similar to the members 17 and 19 in FIG. 1. These members could be pressed up against a ridge similar to the ridge 31a (FIG. 4) within an apertured combustion block similar to the block 31 (FIG. 1). Manifolds similar to manifolds 27 and 29 could also be mounted in a way similar to that shown in FIG. 1 herein. The pump chambers could be integral with the two cylindrical members or could be screwed on at the ends thereof. Alternatively, the more unitized construction of FIG. 5 could easily be adapted to the free-piston engine shown in my aforesaid application.

Many other alternative forms and embodiments of my invention will occur to those skilled in the art, which forms do not depart from the essence of this invention. Consequently, I desire this invention to be limited solely by the claims herein.

I claim:
1. A free-piston engine comprising:
   (a) first integral means having apertures therein and including a combustion region,
   (b) a selected number of means having at least respective portions thereof which interfit the apertures in said first means, said selected number of means having axial bores therein, and
   (c) a selected number of piston members respectively disposed within said bores for axial movement therein, each of said piston members having its peripheral portions arranged for movement substantially only adjacent the wall of said bore in which it is disposed, and
   (d) means for maintaining said interfitting portions pressed into said apertures.

2. A free-piston engine comprising:
   (a) first integral means having apertures therein and including a combustion region,
   (b) second and third means having portions interfitting the apertures in said first means, said second and third means having respective axial bores therein,
   (c) first and second piston members disposed within said bores for axial movement therein; each of said piston members having its peripheral portions arranged for movement substantially only adjacent the wall of said bore in which it is disposed, and
   (d) means for maintaining said interfitting portions pressed into said apertures.

3. A free-piston engine comprising:
   (a) first integral means having apertures therein and including a combustion region,
   (b) second and third means having portions interfitting the apertures within said first means, said second and third means having respective bores therein which are substantially identical to one another,
   (c) first and second piston members constructed and arranged for respective movement within said bores, each of said piston members having its peripheral portions arranged for movement substantially only adjacent the wall of said bore in which it is disposed, and
   (d) means for pressing said interfitting portions into said apertures from each side of said first means and for maintaining said first, second and third means in said interfitting relation.

4. A free-piston engine comprising:
   (a) first integral means having a combustion region and having substantially identical aligned apertures therein,
   (b) first and second substantially identical cylinder means having respective portions which are constructed to interfit the apertures within said first means, said first and second cylinder means having respective bores therein,
   (c) first and second substantially identical piston members constructed and arranged for movement, respectively, within said substantially identical bores, each of said piston members having its peripheral portions arranged for movement substantially only adjacent the wall of said bore in which it is disposed, and
   (d) means for pressing said interfitting portions of said first and second means tightly into said aligned apertures from either side of said first means and to maintain said first means and said two cylinder means in that position, said pressing means also being constructed to cooperate with selected ones of said other means in enclosing spaces on the respective outward sides of said pistons.

5. A free-piston engine comprising:
   (a) first integral means having first and second substantially identical and aligned apertures therein and also having a third aperture between said first and second apertures and communicating therewith,
   (b) first and second substantially identical cylinder means having respective portions constructed and arranged to interfit said first and second apertures matingly, said first and second means also having respective bores which are coaxial when said portions interfit said respective aligned apertures,
   (c) first and second piston members each of which is constructed and arranged to move axially and reciprocally within respective ones of said coaxial bores, each of said piston members having its peripheral portions arranged for movement substantially only adjacent the wall of said bore in which it is disposed,
   (d) first and second means constructed and arranged to press said two cylinder means respectively so that the interfitting portions thereof are pressed tightly into said first and second apertures from either side of said first means and for maintaining said first means and said two cylinder means in that position, said two pressing means also being constructed to define with said piston members and said two cylinder means, a selected number of chambers located outwardly of said piston members.

6. A free-piston engine comprising:
   (a) first integral means having first and second coaxial aligned apertures and also including a third aperture between said first and second apertures which provides space for combustion of a combustible charge,
   (b) first and second cylinder means having respective portions which matingly interfit said first and second coaxial apertures, said respective portions having substantially identical and coaxial bores,
   (c) first and second substantially identical pistons having head portions which are constructed and arranged for mating axial movement within said bores, each of said pistons having its peripheral portions arranged for movement substantially only adjacent the wall of said bore in which it is disposed, and
   (d) first and second means for exerting fixed pressure on said two cylinder means to press said interfitting portions tightly into the apertures of said first member from either side thereof, said pressing means including a plurality of fastening means extending from said first to said second pressing means, said pressing means also cooperating with said pistons and said two cylinder means for enclosing space at the respective ends of said pistons remote from said combustion space.

7. A free-piston engine comprising:
   (a) a combustion block having first and second coaxial apertures therein arranged opposite one another and also having space between said apertures for combustion of fuel,
   (b) first and second substantially identical and apertured manifold structures having hollowed-out portions therein for intake of a combustible charge and for exhausting combustion products respectively,
   (c) first and second substantially identical cylinders having portions constructed and arranged to matingly interfit said apertures in said combustion block said cylinders having substantially identical bores, (d) first and second substantially identical pistons arranged opposite one another within said first and second cylinders for axial movement therein, and (e) means for pressing said first and second cylinders through said manifold members and tightly into the coaxial apertures in said combustion block, said pressing means also being constructed and arranged to maintain the previously-recited elements in fixed, compressive relation.

8. The invention according to claim 7 wherein said interfitting portions of said first and second cylinders contain apertures which enable the hollowed-out portions of said manifolds to communicate with the respective bores of said first and second cylinders.

9. The invention according to claim 7 wherein said pressing means includes flanged end cap portions which interfit said cylinders and have apertures in said flanges, wherein said manifold structures include apertures therein, and wherein said pressing means also includes a selected number of elongated means passing through said apertures in said flanges and in said manifold structures and fastening means associated with said elongated means.

10. The free-piston engine according to claim 7 wherein said combustion block includes an explosive starting means.

11. The invention according to claim 8 wherein the hollowed-out portions of said manifold structures are eccentric and the apertures contained in said interfitting portions of said first and second cylinders are so constructed that they cooperate with said eccentric portions to provide substantially non-turbulent intake of the combustible charge into said combustion space and substantially non-turbulent exhaust of the products of combustion.

12. The invention according to claim 7 wherein the apertures in said manifold structures are so arranged and constructed that respective ones of said portions of said first and second cylinders also matingly interfit said apertures.

13. A free-piston engine comprising:

(a) a combustion block having two large coaxial apertures therein which are substantially identical and a third aperture smaller than said two apertures and which connects said two apertures, (b) first and second substantially identical intake and exhaust manifolds each having apertures therein and eccentric hollowed-out interior regions, said manifolds also having smaller apertures therein, (c) first and second substantially identical cylinders each having a larger and a smaller diameter section, said smaller diameter sections being constructed to pass through respective ones of the apertures in said manifolds and into the two larger apertures in said combustion block, the outer surface of said smaller diameter sections being constructed to interfit matingly with the edges of said apertures in said manifolds and with the edges of said two larger apertures in said combustion block, said larger and smaller diameter sections having respective larger and smaller diameter bores, said smaller diameter sections also being provided with a selected number of apertures which communicate their bores with respective ones of said interior regions of said manifolds when said sections interfit with the respective apertures of said manifolds, said cylinders having end sections with flanges in which apertures are located, (d) first and second substantially identical pistons each having a larger and a smaller diameter part, each of said pistons being disposed within a respective one of said first and second cylinders for axial movement therein, the larger diameter parts matingly engaging the larger diameter bores and the smaller diameter parts matingly engaging the smaller diameter bores of said cylinders, said larger parts effectively dividing the space within said first and second cylinders into outwardly disposed rebounce chambers and more inwardly disposed pump chambers, (e) means communicating said pump chambers with one another and with valves regulating the intake and output of the medium pumped in said pump chambers, (f) a selected number of bolts which pass through the apertures in the flanges of said cylinders and said smaller apertures of said manifolds, and (g) a selected number of fastening means used with said bolts for maintaining said smaller diameter sections of said cylinders pressed tightly into said two larger apertures in said combustion block and against said larger apertures of said manifolds.

14. A free-piston engine comprising:

(a) a combination block having first and second coaxial apertures therein arranged opposite one another and also having space for combustion of a charge of fuel and air, said block also having hollowed-out manifold structures there for intake of a fuel and air charge and exhaust of combustion products respectively, said block also having a third aperture therein running substantially parallel to the axis of said block, (b) first and second cylinders having respective portions thereof constructed and arranged to interfit matingly said coaxial apertures in said block, said cylinders having substantially identical bores, (c) first and second pistons arranged within respective ones of said cylinders opposite each other and movable axially therein, and (d) means for pressing said first and second cylinders so that said interfitting portions thereof are urged tightly into the coaxial apertures of said combination block from either side thereof and for maintaining said cylinders and said block in said position.

15. The free-piston engine according to claim 14 wherein said interfitting portions of said cylinders contain apertures by which said hollowed-out portions of said manifolds communicate with respective ones of said bores of said cylinders.

16. The free-piston engine according to claim 14 wherein said pressing means includes first and second end members which have flanges having apertures therein, a selected number of bolts passing through said apertures in said flanges, and a selected number of fastening means for said bolts.

17. The free-piston engine according to claim 14 in which said pistons have demountable head sections.

18. The free-piston engine according to claim 14 wherein said combination block includes an explosive starting means.

19. The free-piston engine according to claim 15 wherein the hollowed-out portions of said manifold structure are eccentric and the apertures in said interfitting portions of said first and second cylinders are slanted and constructed to cooperate with said eccentric portions to enable substantially non-turbulent intake of an air-fuel charge into said combustion space and substantially non-turbulent exhaust of products of combustion.

20. The free-piston engine according to claim 14 wherein each of said pistons has a larger diameter part and a smaller diameter part and each has a circular groove formed in said larger diameter part, and wherein said cylinders have substantially cylindrical outward extensions of said interfitting portions thereof which engage said grooves.

21. The free-piston engine according to claim 14 wherein said cylinders have respective apertures which are aligned with the third aperture in said block to enable the respective pump chambers formed by the pistons and said cylinders to communicate with one another.

22. The free-piston engine according to claim 16 wherein said pistons are provided with openings in their outermost parts and said end members are provided with fixed elongated hollow members each having one end which communicates with the exterior of said engine and its other end which communicates with the interior of said engine, said elongated members being constructed to fit within said openings.

23. The engine according to claim 21 wherein said block also has a fourth aperture transverse to and communicating with the third aperture therein and being adapted to be connected to conduits external to said engine.

24. The engine according to claim 20 wherein said cylinders also have portions whose bores are larger than the bores of said interfitting portions and wherein said larger diameter parts of said pistons move in said larger bore portions.

25. The engine according to claim 22 with the addition of means in said end members for permitting the introduction of a gaseous phase material into said engine to exert pressure on the outer surfaces of said pistons.

References Cited in the file of this patent

UNITED STATES PATENTS

| | | |
|---|---|---|
| 2,025,177 | Pescara | Dec. 24, 1935 |
| 2,344,058 | Pescara | Mar. 14, 1944 |
| 2,853,982 | Bachle et al. | Sept. 30, 1958 |
| 2,865,349 | MacDonald | Dec. 23, 1958 |